United States Patent [19]
Ellis et al.

[11] 3,839,339
[45] Oct. 1, 1974

[54] TETRAZOLYL CHROMONES
[75] Inventors: Gwynn Pennant Ellis; David Shaw, both of Cardiff, Wales
[73] Assignee: Allen & Hanburys Limited, London, England
[22] Filed: Jan. 21, 1971
[21] Appl. No.: 108,581

[30] Foreign Application Priority Data
Feb. 5, 1970 Great Britain .................... 5533/70

[52] U.S. Cl. ........ 260/308 D, 260/345.2, 260/473 S, 424/269
[51] Int. Cl. ............................................ C07d 99/04
[58] Field of Search ...... 260/308 D, 345.2; 424/283

[56] References Cited
UNITED STATES PATENTS
3,427,324   2/1969   Fitzmaurice ..................... 260/340.7
FOREIGN PATENTS OR APPLICATIONS
4,767    1/1967   France ............................... 424/283

OTHER PUBLICATIONS
Juby, et al., I. J. Med. Chem., Vol. 11, pp. 111–117, (1968), RS1J5.
Juby, et al., II, J. Med. Chem., Vol. 12, pp. 396–401, (1969), RS1J5.
Graff, Essays In Biochemistry, (John Wiley & Sons, Inc., N.Y., 1956), pages 153–154.

*Primary Examiner*—Alton D. Rollins
*Attorney, Agent, or Firm*—Bacon & Thomas

[57] ABSTRACT

The invention provides compounds of the general formula I:

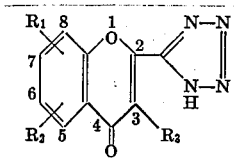

I (in which $R_1$, $R_2$ and $R_3$, which may be the same or different, represent a hydrogen atom, an alkyl group containing 1–6 carbon atoms, a nitro, amino, alkyl-substituted amino, hydroxy, carboxylic, alkoxy, aryloxy or heterocyclic group, or a halogen atom, and in which the alkoxy group may be substituted by a hydroxy or alkoxy carbonyl group; and pharmaceutically acceptable non-toxic salts threof including esters of those compounds in which the groups $R_1$, $R_2$ or $R_3$ represents a carboxylic group.

Pharmaceutical compositions containing these compounds are also provided as well as methods for production thereof.

5 Claims, No Drawings

TETRAZOLYL CHROMONES

This invention relates to novel chromone derivatives, to processes for the preparation thereof and to compositions containing such derivatives.

We have found that certain new chromone derivatives have useful pharmacologica activity and in particular inhibit the release of spasmogen mediators from antigen antibody reactions.

Accordingly the present invention provides compounds of the general formula I

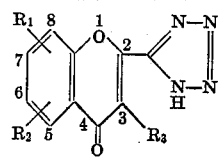

I (in which $R_1$, $R_2$ and $R_3$, which may be the same or different, represent a hydrogen atom, an alkyl group containing 1 - 6 carbon atoms, a nitro, amino, alkyl-substituted amino, hydroxy, carboxylic, alkoxy, aryloxy or heterocyclic group, or a halogen atom, and in which the alkoxy group may be substituted by a hydroxy or alkoxy carbonyl group; and pharmaceutically acceptable non-toxic salts thereof including esters of those compounds in which the groups $R_1$, $R_2$ or $R_3$ represents a carboxylic group. Pharmaceutically acceptable salts may be formed with organic bases, e.g., dimethylaminoethanol, and with inorganic bases, e.g., sodium hydroxide, potassium hydroxide, ammonium hydroxide where $R_1$, $R_2$ and $R_3$ contain basic substituents the invention also provides non-toxic salts with acids, e.g., hydrochlorides.

Also included are esters of the carboxylic acid function ($R_1$, $R_2$, or $R_3$ =COOH) for example those with lower alkanols are preferred. Where $R_1$, $R_2$ and/or $R_3$ are alkyl this is preferably methyl or ethyl and where they are alkoxy, the alkoxy group preferably contains from 1 to 4 carbon atoms.

The aryloxy group is preferably a benzyloxy group; and the heterocyclic group is preferably tetrazolyl.

Specific preferred compounds are:
2-(Tetrazol-5-yl)-chromone.
2-(Tetrazol-5-yl)-6-methylchromone and dimethylaminoethanol salt.
2-(Tetrazol-5-yl)-7-methylchromone.
2-(Tetrazol-5-yl)-8-methylchromone.
2-(Tetrazol-5-yl)-5,7-dimethylchromone.
2-(Tetrazol-5-yl)-3-methylchromone.
2-(Tetrazol-5-yl)-5-methoxychromone.
2-(Tetrazol-5-yl)-7-methoxychromone.
2-(Tetrazol-5-yl)-6-chlorochromone.
2-(Tetrazol-5-yl)-6-bromochromone.
2-(Tetrazol-5-yl)-6-nitrochromone.
Ethyl 2-(tetrazol-5-yl)-chromone-6-carboxylate.
2-(Tetrazol-5-yl)-chromone-6-carboxylic acid.
2-(Tetrazol-5-yl)-5-(2-hydroxyethoxy)-chromone monohydrate.
2-(Tetrazol-5-yl)-7-benzyloxychromone.
2-(Tetrazol-5-yl)-7-ethoxycarbonylmethoxychromone.
2-(Tetrazol-5-yl)-6-dimethylaminochromone.
2,6Di(Tetrazol-5yl)-chromone.
2-(Tetrazol-5-yl)-6,8-dibromochromone.
2-(Tetrazol-5-yl)-3-chlorochromone.

The chromone derivatives according to the invention have been shown to inhibit the release of spasmogens from antigen antibody reactions such as occur in the rat during the PCA (passive cutaneous anaphylaxis) test described by Ogilvie (J. Immunol 1967, 12, (2), 113). In another test described by Moise, et al., (J. Immunol 1968, 102, 327) certain chromone derivatives have been shown to inhibit the release of histamine initiated by two classes of antibodies. Thus the compound of Example 1 was found to be 1.5 times as active as Intal (disodium chromoglycate) at a dose level of 1 mg/kg I.V in the sensitised rat when given 15 minutes before antigen challenge. These compounds are therefore of value in the treatment of conditions in which extrinsic antigen combination with a reaginic antibody is primarily responsible for example extrinsic asthma, hay fever, urticaria, eczema, or atopic dermatitis.

The invention also provides pharmaceutical compositions which contain a chromone derivative of general formula I or a salt or ester thereof together with a pharmaceutically acceptable carrier, excipient or other formulatory agent. The compositions may also contain supplementary medicinal agents, e.g., a bronchodilator, antihistamine, tranquilliser or anxiolytic. Forms for oral administration include tablets, capsules, syrups or emulsions.

For administration by inhalation the compositions according to the invention may be in the form of a powder or snuff or as an aerosol spray presentation. The last may conveniently be a pressurized pack with a metering valve to deliver a fixed dossage unit or maybe an aqueous solution that may be delivered via a nebuliser device. The dossage at which the active ingredient is administered may vary within a wide range. For inhalation the dose may be from 0.1–20 mgs in divided doses.

The compounds according to the invention may be prepared by reacting a nitrile of general formula II where $R_1$, $R_2$ and $R_3$ are as previously defined, with hydrazoic acid or a salt thereof. Suitable salts include, for example sodium azide, ammonium azide or salts with organic bases such as aniline.

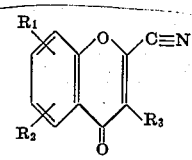

II

The reaction is preferably effected in a solvent such as for example, dimethylformamide, tetrahydrofuran, dioxan, or ethylene glycol dimethylether at elevated temperature (50°– 100°C) using for example a steam bath. The nitriles II may be prepared from the corresponding acids, esters or amides for example as follows:

R = the chromone moiety (1) R-COOH → R-COOAlk $\xrightarrow{NH_3}$ R-CO-NH$_2$ (wherein Alk is an alkyl group)

(2) R-COOH $\xrightarrow{SOCl_2}$ R-COCl $\xrightarrow{NH_3}$ R-CO-NH$_2$

DMF (dimethylformamide)
  Cl-COOEt
(3) R-COOH → R-CO-O-CO-Et → R-CO-NH$_2$
  arylsulphonyl chloride and pyridine + DMF
(4) R-CO-NH$_2$ → R-C≡N Another process is by reacting an alkyl (2-hydroxyphenyl) ketone of general formula III with diethyl oxalate in the presence of sodium ethoxide or ethyloxalyl chloride in pyridine

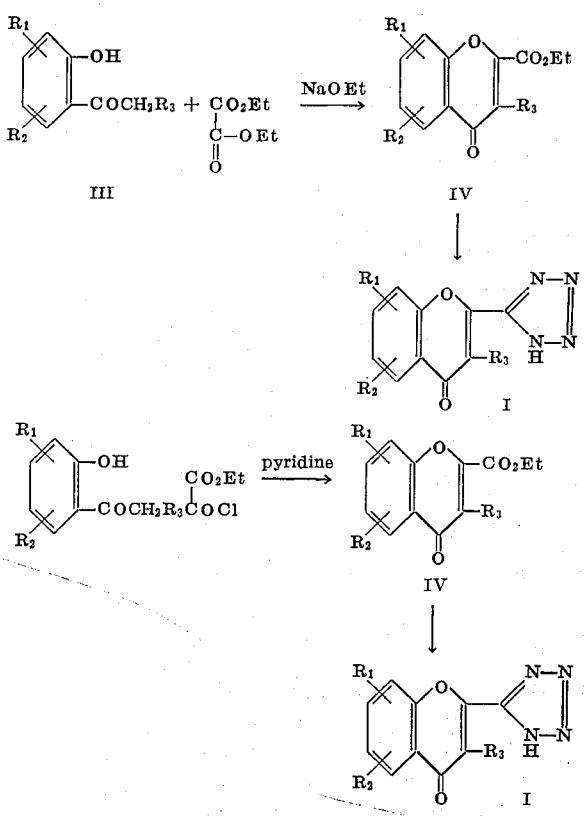

Compounds of general formula I may be prepared from compounds of general formula IV by methods previously stated.

Compounds of general formula I wherein $R_1$ and $R_2$ form a cycloalkyl group may be prepared from the corresponding amide by treatment with an arylsulphonyl chloride in the presence of pyridine as follows:

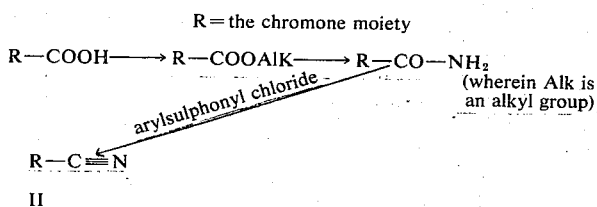

The nitriles are converted to compounds of general formula I as previously stated.

Where $R_1$ or $R_2$ represents a carboxylic (—COOH) group the compound may be prepared by hydrolysis of the corresponding ester as described in Example 13 below.

The compounds according to the invention may be isolated in salt form and converted from one salt to another as desired by conventional methods.

The following Examples illustrate the invention.

EXAMPLE 1

2-(Tetrazol-5-yl) chromone
a. Chromone-2-carboxamide

Into a stirred solution of ethyl chromone-2-carboxylate (6.0 g) in anhydrous ethanol (60 ml), cooled in an ice bath, was passed a stream of ammonia gas for 20 minutes. The solid obtained was filtered, and dried to give chromone-2-carboxamide (4.6 g), m.p. 256°–257° (decomp) (from ethanol).

b. 2-cyanochromone

A stirred mixture of chromone-2-carboxamide (5.0 g), toluene-4-sulphonyl chloride (7.5 g) and pyridine (6.5 ml) in dimethylformamide (30 ml) was heated on an oil bath at 85°–90° for 8 hours. After standing overnight the mixture was poured into water (250 ml) and the precipitated solid filtered, and dried to give 2-cyanochromone (3.3 g), m.p. 127°–128° (from ethanol).

c. 2-(Tetrazol-5-yl)chromone

A mixture of 2-cyanochromone (3.2 g), sodium azide (1.83 g) and ammonium chloride (1.39 g) in dimethylformamide (30 ml) was heated with stirring on a steam bath for 8 hours. The excess sodium azide and ammonium chloride were removed by filtration, and the dimethylformamide distilled off under reduced pressure. The residue was treated with water (200 ml) and acidified with dilute hydrochloric acid to pH 2. The Yellow precipitate was filtered, dried and crystallised from methanol to give 2-(tetrazol-5-yl)chromone (2.6 g), m.p. 270°–271° (decomp).

EXAMPLE 2

2-(Tetrazol-5-yl)-6-methylchromone
a. 6-Methylchromone-2-carboxamide

By the method of Example 1(a) ethyl 6-methylchromone-2-carboxylate (25.0 g) in anhydrous ethanol (250 ml) was treated with ammonia to give 6-methylchromone-2-carboxamide (22.4 g), m.p. 325°–329° (decomp) (from ethanoldimethylformamide).

b. 2-Cyano-6-methylchromone

By the method of Example 1(b) 6-methylchromone-2-carboxamide (10.2 g) was dehydrated with toluene-4-sulphonyl chloride (13.7g) and pyridine (12 ml) in dimethylformamide (40 ml) to give 2-cyano-6-methylchromone (6.8 g), m.p. 160°–161° (from ethanol).

c. 2-(Tetrazol-5-yl)-6-methylchromone

By the method of Example 1(c) 2-cyano-6-methylchromone (2.7 g) was reacted with sodium azide (1.4 g) and ammonium chloride (1.2 g) in dimethylformamide (30 ml) to give 2-(tetrazol-5yl)-6-methylchromone (2.4 g), m.p. 273°–274° (decomp) (from methanol-dimethylformamide).

2-(Tetrazol-5-yl)-6-methylchromone, dimethylaminoethanol salt.

The tetrazoyl chromone (0.6 g.) was suspended in dimethylformamide (25 ml.), dimethylaminoethanol (2 ml) was added and the mixture shaken to give a faint yellow solution. This was filtered and diluted with ether (50 ml). The salt crystallised out as an off white solid (0.621 g) m.p. 180°–183° (softens from 176°).

EXAMPLE 3

2-(Tetrazol-5-yl)-7-methylchromone
a. Ethyl 7-methylchromone-2-carboxylate

To a solution of sodium ethoxide (prepared from 18.4 g of sodium and anhydrous ethanol (700 ml) was added, with stirring, a mixture of 4-methyl-2-hydroxyacetophenone (60.0 g) and diethyl oxalte (116.8 g). The reaction mixture was heated under reflux for 3 hours and concentrated hydrochloric acid (112 ml) was added (for cyclization of the ester of 4-methyl-2-hydropybenzoyl pyruvic acid). The mixture was refluxed for 30 minutes, then cooled and poured into a large volume of water. The precipitate was filtered and washed with water, sodium bicarbonate solution and more water to give ethyl 7-methylchromone-2-carboxylate (67.0 g), m.p. 57°–58° (from aqueous ethanol).

b. 7-Methylchromone-2-carboxamide

By the method of Example 1(a) ethyl 7-methylchromone-2-carboxylate (40.0 g) in anhydrous ethanol (400 ml) was treated with ammonia to give 7-methylchromone-2-carboxamide (33.6 g), m.p. 322°–323° (decomp) (from ethanoldimethylformamide).

c. 2-Cyano-7-methylchromone

By the method of Example 1(b) 7-methylchromone-2-carboxamide (30.0 g) was dehydrated using toluene-4-sulphonyl chloride (42.1 g) and pyridine (36 ml) in dimethylformamide (150 ml) to give 2-cyano-7-methylchromone (18.7 g), m.p. 146°–147° (from ethanol).

d. 2-(Tetrazol-5-yl)-7-methylchromone

By the method of Example 1(c) 2-cyano-7-methylchromone (15.0 g) was reacted with sodium azide (6.8 g) and ammonium chloride (5.6 g) in dimethylformamide (100 ml) to give 2-(tetrazol-5-yl)-7-methylchromone (13.5 g), m.p. 275°–276° (decomp) (from ethanol).

EXAMPLE 4

2-(Tetrazol-5yl)-8-methylchromone a. Ethyl 8-methylchromone-2-carboxylate

By the method of Example 3(a) 3-methyl-2-hydroxyacetophenone (30.0 g) was reacted with diethyl oxalate (58.4 g) in the presence of sodium ethoxide (prepared from sodium (9.2 g) in anhydrous ethanol (300 ml)), and the product was cyclised with concentrated hydrochloric acid (56 ml) to give ethyl 8-methylchromone -2-carboxylate (38.0 g), m.p. 100°–101°(from ethanol).

b. 8-Methylchromone-2-carboxamide

By the method of Example 1(a) ethyl 8-methylchromone-2-carboxylate (30.0 g) in anhydrous ethanol (250 ml) was treated with ammonia to give 8-methylchromone-2-carboxamide (22.5 g), m.p. 285°–287° (decomp) (from ethanol-dimethylformamide).

c. 2-Cyano-8-methylchromone

By the method of Example 1(b) 8-methylchromone-2-carboxamide (20.3 g) was dehydrated using toluene-4-sulphonyl chloride (27.5 g) and pyridine (25 ml) in dimethylformamide (100 ml) to give 2-cyano-8-methylchromone (17.0 g), m.p. 99°–100° (from ethanol).

d. 2-(Tetrazol-5-yl)-8-methylchromone

By the method of Example 1(c) 2-cyano-8-methylchromone (11.0 g) was cyclised with sodium azide (4.7 g) and ammonium chloride (4.0 g) in dimethylformamide (100 ml) to give 2-(tetrazol-5-yl) -8-methylchromone (14.6 g), m.p. 264°–265° (decomp) (from ethanol).

EXAMPLE 5

2-(Tetrazol-5-yl)-5,7-dimethylchromone a. Ethyl 5,7-dimethylchromone-2-carboxylate By the method of Example 3(a), 4,6-dimethyl-2-hydroxyacetophenone (32.8 g) was condensed with diethyl oxalate (58.4 g) in the presence of sodium ethoxide (prepared from sodium (13.8 g) in anhydrous ethanol (450 ml)) and the product cyclised with concentrated hydrochloric acid (84 ml) to give ethyl 5,7-dimethylchromone-2-carboxylate (32.6 g), m.p. 136°–137° (from aqueous ethanol).

b. 5,7-Dimethylchromone-2-carboxamide

By the method of Example 1(a), ethyl 5,7-dimethylchromone-2-carboxylate (30.0 g) in anhydrous ethanol (300 ml) was treated with ammonia to give 5,7-dimethylchromone-2-carboxamide (25.4 g), m.p. 337°–338° (decomp) (from ethanoldimethylformamide).

C. 2-Cyano-5,7-dimethylchromone

By the method of Example 1(b), 5,7-dimethylchromone-2-carboxamide (21.7 g) was dehydrated using toluene-4sulphonyl chloride (28.5 g) and pyridine (24.0 ml) in dimethylformamide (150 ml) to give 2-cyano-5,7-dimethylchromone (14.7 g), m.p. 145°–146° (from ethanol).

d. 2-(Tetrazol-5-yl)-5,7-dimethylchromone

By the method of Example 1(c), 2-cyano-5,7-dimethylchromone (8.0 g) was reacted with sodium azide (3.9 g) and ammonium chloride (3.2 g) in dimethylformamide (50 ml) to give 2-(tetrazol-5-yl)-5,7-dimethylchromone (10.2 g), m.p. 275°–276° (decomp) (from ethanol).

EXAMPLE 6

2-(Tetrazol-5-yl)-3-methylchromone a. Ethyl 3-methylchromone-2-carboxylate

Ortho hydroxypropiophenone (20 g) was heated with ethyloxalyl chloride (36.2 g) in pyridine (30 ml) on a steam bath for 45 minutes. After cooling, the reaction mixture was poured into dilute hydrochloric acid (100 ml 1:5). An oil separated which was extracted with ether (3 × 100). The ether solution was dried over sodium sulphate, the ether removed to give ethyl 3-methylchromone-2-carboxylate (14.0 g) m.p. 90°–91° (from ethanol). The ethyl 3-methylchromone -2-carboxylate is converted to 2-(tetrazol-5-yl)- 3-methylchromone.

b. 3Methylchromone-2-carboxamide

By the method of Example 1(a), ethyl 3-methylchromone-2-carboxylate (12.0 g) in anhydrous ethanol (100 ml) was treated with ammonia to give 3-methylchromone-2-carboxamide (10.4 g), m.p. 250°–252° (decomp) (from ethanol).

c. 2-Cyano-3-methylchromone

By the method of Example 1(*b*), 3-methylchromone-2-carboxamide (8.0 g) was dehydrated using toluene-4-sulphonyl chloride (11.2 g) and pyridine (9.5 ml) in dimethylformamide (40 ml) to give 2-cyano-3-methylchromone (5.5 g), m.p. 145°–146° (from aqueous ethanol).

d. 2-(Tetrazol-5-yl)-3-methylchromone

By the method of Example 1(c), 2-cyano-3-methylchromone (6.0 g) was reacted with sodium azide (3.2 g) and ammonium chloride (2.6 g) in dimethylformamide (50 ml) to give 2-(tetrazol-5-yl)-3- methylchromone (4.3 g), m.p. 249°–250 (decomp) (from ethanol).

EXAMPLE 7

2(Tetrazol-5-yl)-5-methoxychromone a. Ethyl 5-methoxychromone-2-carboxylate

By the method of Example 3(a), 2-hydroxy-6-methoxyacetophenone (13.3 g) was condensed with diethyl oxalate (25.2 g) in the presence of sodium ethoxide (prepared from sodium (4.6 g) in anhydrous ethanol (250 ml)) and the product was cyclised with concentrated hydrochloric acid (28 ml) to give ethyl 5-methoxychromone-2-carboxylate (11.7 g), m.p. 125°–126° (from aqueous ethanol).

b. 5-Methoxychromone-2-carboxamide

By the method of Example 1(a), ethyl 5-methoxychromone-2-carboxylate (10.0 g) in anhydrous ethanol (100 ml) was treated with ammonia to give 5-methoxychromone-2-carboxamide (8.0 g), m.p. 284°–285° (decomp) (from ethanol dimethylformamide).

c. 2-Cyano-5-methoxychromone

By the method of Example 1(b), 5-methoxychromone-2-carboxamide (7.0 g) was dehydrated using toluene-4-sulphonyl chloride (9.1 g) and pyridine (7.6 ml) in dimethylformamide (50 ml) to give 2-cyano-5-methoxychromone (3.7 g), m.p. 161°–162° (from ethanol).

d. 2(Tetrazol-5yl)-5-methoxychromone

By the method of Example 1(c), 2-cyano-5-methoxychromone (2.0 g) was reacted with sodium azide (1.0 g) and ammonium chloride (0.8 g) in dimethylformamide (20 ml) to give 2-(tetrazol-5-yl)-5-methoxychromone (1.6 g), m.p. 256°–257° (decomp) (from ethanol).

EXAMPLE 8

2-(Tetrazol-5-yl)-7-methoxychromone a. 7-Methoxychromone-2-carboxamide

By the method of Example 1(a) ethyl 7-methoxychromone-2-carboxylate (25.0 g) in anhydrous ethanol (250 ml) was treated with ammonia to give 7-methoxychromone-2-carboxamide (22.4 g), m.p. 298°–300° (decomp) (from ethanol dimethylformamide).

b. 2-Cyano-7-methoxychromone

By the method of Example 1(b) ) 7-methoxychromone-2-carboxamide (21.9 g) was dehydrated using toluene-4-sulphonyl chloride (28.7 g) and pyridine (24.0 ml) in dimethylformamide (70 ml) to give 2-cyano-7-methoxychromone (17.9 g). m.p. 150°–153° (from ethanol).

C. 2-(Tetrazol-5-yl)-7-methoxychromone

By the method of Example 1(c) 2-cyano-7-methoxychromone (15.0 g) was reacted with sodium azide (4.9 g) and ammonium chloride (4.0 g) in dimethylformamide (100 ml) to give 2-(tetrazol-5-yl)-7-methoxychromone (12.9 g), m.p. 265°–267° (decomp) (from ethanol).

EXAMPLE 9

2-(Tetrazol-5-yl)-6-chlorochromone a. 6-Chlorochromone-2-carboxamide

By the method of Example 1(a) ethyl 6-chlorochromone-2-carboxylate (10 g) in anhydrous ethanol (100 ml) was treated with ammonia to give 6-chlorochromone-2-carboxamide (8.6 g), m.p. 314°–315° (decomp) (from ethanol-dimethylformamide).

b. 6-Chloro-2-cyanochromone

By the method of Example 1(b) 6-chlorochromone-2-carboxamide (11.15 g) was dehydrated with toluene-4-sulphonyl chloride (19.1 g) and pyridine (24 ml) in dimethylformamide (25 ml) to give 6-chloro-2-cyanochromone (6.7 g), m.p. 204°–206° (from ethanol).

c. 2-(Tetrazol-5yl)-6-chlorochromone

By the method of Example 1(c) 6-chloro-2-cyanochromone (2.1 g) was reacted with sodium azide (1.0 g) and ammonium chloride (0.8 g) in dimethylformamide (20 ml) to give 2-(tetrazol-5yl)-6-chlorochromone (1.6 g), m.p. 252°–253° (decomp) (from ethanol).

EXAMPLE 10

2-(Tetrazol-5-yl)-6-bromochromone a. 6-Bromochromone-2-carboxamide

By the method of Example 1(a) ethyl 6-bromochromone-2-carboxylate (10.0 g) in anhydrous ethanol (100 ml) was treated with ammonia to give 6-bromochromone-2-carboxamide (8.2 g), m.p. 308°–310° (decomp) (from ethanol-dimethylformamide).

b. 6-Bromo-2-cyanochromone

By the method of Example 1(b) 6-bromochromone-2-carboxamide (5.4 g) was dehydrated using toluene-4-sulphonyl chloride (5.7 g) and pyridine (5 ml) in dimethylformamide (40 ml) to give 6-bromo-2-cyanochromone (3.8 g), m.p.200°–201° (from ethanol).

c. 2-(Tetrazol-5-yl)-6-bromochromone

By the method of Example 1(c) 6-bromo-2-cyanochromone (1.25 g) was reacted with sodium azide (1.0 g) and ammonium chloride (0.8 g) in dimethylformamide (25 ml) to give 2-(tetrazol-5-yl)-6-bromochromone (1.4 g), m.p. 266°–267° (decomp) (from methanol).

EXAMPLE 11

2-(Tetrazol-5-yl)-6-nitrochromone a. 6-Nitrochromone-2-carboxamide

By the method of Example 1(a) ethyl 6-nitrochromone-2-carboxylate (12.0 g) in anhydrous ethanol (125 ml) was treated with ammonia to give 6-nitrochromone-2-carboxamide (10.4 g), m.p. 302°–305° (decomp) (from ethanoldimethylformamide).

b. 2-Cyano-6-nitrochromone

By the method of Example 1(b) 6-nitrochromone-2-carboxamide (9.4 g) was dehydrated with toluene-4-sulphonyl chloride (10.4 g) and pyridine (10 ml) in dimethylformamide (100 ml) to give 2-cyano-6-nitrochromone (4.9 g), m.p. 150°–151° (from ethanol).

c. 2-(Tetrazol-5-yl)-6-nitrochromone

By the method of Example 1(c) 2-cyano-6-nitrochromone (4.0 g) was reacted with sodium azide (1.6 g) and ammonium chloride (1.3 g) in dimethylformamide (50 ml) to give 2(tetrazol-5-yl)-6-nitrochromone (4.4 g), m.p. 256°–257° (decomp) (from ethanol).

EXAMPLE 12

Ethyl 2-(tetrazol-5-yl)chromone-6-carboxylate a. Diethyl chromone -2,6-dicarboxylate By the method of Example 3(a) ethyl 3-acetyl-4-hydroxybenzoate (30.0 g) was condensed with diethyl oxalate (43.8 g) in the presence of sodium ethoxide (prepared from sodium (6.9 g) in anhydrous ethanol (200 ml)) and the product cyclised with concentrated hydrochloric acid (42 ml) to give diethyl chromone -2,6-dicarboxylate (27.0 g), m.p. 126°–127° (from ethanol).

b. 6-Ethoxycarbonylchromone-2-carboxamide

By the method of Example 1(a) diethyl chromone-2,6-dicarboxylate (24.0 g.) in anhydrous ethanol (250 ml) was treated with ammonia to give 6-ethoxycarbonylchromone-2-carboxamide (20.7 g) m.p. 306°–308°(decomp) (from ethanoldimethylformamide).

c. Ethyl 2-cyanochromone-6-carboxylate

By the method of Example 1(b) 6-ethoxycarbonylchromone-2-carboxamide (18.0 g) was dehydrated with toluene-4-sulphonyl chloride (19.6 g) and pyridine (18 ml) in dimethylformamide (100 ml) to give ethyl 2-cyanochromone-6-carboxylate (15.3 g), m.p. 161°–162° (from ethanol).

d. Ethyl 2-(tetrazol-5-yl)chromone-6-carboxylate

By the method of Example 1(c) ethyl 2-cyanochromone-6-carboxylate (10.0 g) was reacted with sodium azide (3.5 g) and ammonium chloride (2.9 g) in dimethylformamide (80 ml) to give ethyl 2-(tetrazol-5-yl)chromone-6-carboxylate (7.7 g), m.p. 233°–234° (from ethanol.

EXAMPLE 13

2-(Tetrazol-5-yl) -yl)chromone-6-carboxylic acid

Ethyl 2-(tetrazol-5-yl) chromone-6-carboxylate from Example 12 (5.0 g) was hydrolysed by refluxing with glacial acetic acid (30 ml) and concentrated hydrochloric acid (10 ml) for 3 hours and the solid that separated on cooling filtered off to give 2(tetrazol-5-yl) chromone-6-carboxylic acid (3.7 g), m.p. 293°–294° (decomp) (from ethanol-dimethylformamide).

EXAMPLE 14

2-(Tetrazol-5-yl)-5-(2-hydroxyethoxy) chromone monohydrate a. 5-(2-Hydroxyethoxy)chromone-2-carboxamide Ethyl 5-(2Hydroxyethoxy)chromone-2-carboxylate (1.4 g) ethanol (30 ml), and methylene chloride (10 ml) were cooled by means of an ice bath and ammonia gas was passed into the stirred solution for 3 hours. The precipitated solid was filtered, washed with methylene chloride, and dried at 60° to give an off-white solid (1.0 g), m.p. 248°–249°. Recrystallisation from metahanol gave colourless needles m.p. 252°.

b. 5-(2-Hydroxyethoxy)chromone-2-carboxamide formate

Acetoformic acid reagent (20 ml) was added dropwise to a stirred slurry of 5-(2-hydroxyethoxy)chromone-2-carboxamide (1.7 g) in pyridine (15 ml) at 0° at a rate which maintained the temperature below 5°. The reaction mixture was stirred at 0°–5° for 1 hour and then overnight at room temperature. Ether (200 ml) was added and the solid filtered, washed with ether, and dried at 60° to give an off-white solid (1.8 g), m.p. 220°–221°.

c. 5-(2-Hydroxyethoxy)chromone-2-carbonitrile formate 5-(2-Hydroxyethoxy)chromone-2-carboxamide (1.4 g), toluene-4-sulphonyl chloride (9.5 g), pyridine (20 ml) and dimethylformamide (20 ml) were stirred at 70° for 90 minutes, cooled, poured into water (200 ml), and acidified with 2N hydrochloric acid. The solid was filtered, well washed with water, and dried at 60° to give a light brown solid (0.7 g), m.p. 135°–136°.

d. 2-(Tetrazol-5-yl)-5-(2-hydroxyethoxy)chromone monohydrate 5-(2-Hydroxyethoxy)chromone-2-carbonitrile formate (0.7 g), sodium azide (0.18 g), ammonium chloride (0.14 g) and dimethylformamide (10 ml) was stirred at 90° for 3 hours cooled, and poured into water (200 ml) to give an off-white solid (0.7 g), m.p. 200°–202°. The solid was stirred with 2N hydrochloric acid (50 ml) at 80° for 1 hour, cooled, and poured into water (50 ml). The solid was filtered, washed with water, and dried at 60° to give an off-white solid (0.5 g), m.p. 216°–217°, which is 2-(Tetrazol-5yl)-5-(2-hydroxyethoxy) chromone monohydrate.

EXAMPLE 15

2(Tetrazol-5-yl)-7-benzyloxychromone a. 7Benzyloxychromone-2-carboxamide

By the method of Example. 1(a), ethyl 7-benzyloxychromone-2-carboxylate (15.0 g) in anhydrous ethanol (100 ml) was treated with ammonia to give 7-benzyloxychromone -2-carboxamide (13.2 g), m.p. 280°–282° (decomp) (from ethanoldimethylformamide).

b. 7-Benzyloxy-2-cyanochromone

By the method of Example 1(b), 7-benzyloxychromone-2-carboxamide (10.0 g) was dehydrated using toluene-4-sulphonyl chloride (9.8 g) and pyridine (8.0 ml) in dimethylformamide (50 ml) to give 7-benzyloxy-2-cyanochromone (7.7 g), m.p. 135°–136° (from ethanol).

c. 2-(Tetrazol-5-yl)-7-benzyloxychromone

By the method of Example (c), 7-benzyloxy-2-cyanochromone (6.0 g) was reacted with sodium azide (2.1 g) and ammonium chloride (1.7 g) in dimethylformamide (30 ml) to give 2-(tetrazol-5-yl)-7-benzyloxychromone (4.2 g), m.p. 235°–237° (decomp) (from ethanol).

EXAMPLE 16

2-(Tetrazol-5-yl)-7-ethoxycarbonylmethoxychromone a. Ethyl 7-ethoxycarbonylmethoxychromone-2-carboxylate Ethyl 7-hydroxychromone-2-carboxylate (25.5 g), potassium carbonate (10.0 g), and ethyl bromoacetate (17.5 g) in acetone (100 ml) were heated under reflux for 8 hours. The solvent was removed by distillation, the remaining solid taken up with water and the residue filtered off and crystallised from aqueous ethanol to give 7-ethoxycarbonylmethoxychromone-2-carboxylate (22.6 g), m.p. 113°–114° (from aqueous ethanol).

b. 7-Ethoxycarbonylmethoxychromone-2-carboxamide

By the method of Example 1(a), ethyl 7-ethoxycarbonylmethoxychromone-2-carboxylate (20.0 g) in anhydrous ethanol (200 ml) was treated with ammonia to give 7-ethoxycarbonylmethoxychromone-2-carboxamide (15.6 g), m.p. 270°–271° (from ethanol-dimethylformamide).

c. 2-Cyano-7-ethoxycarbonylmethoxychromone

By the method of Example 1(b), 7-ethoxycarbonylmethoxychromone-2-carboxamide (14.3 g) was dehydrated using toluene-4-sulphonyl chloride (14.0 g) and pyridine (11.8 ml) in dimethylformamide (100 ml) to give 2-cyano-7-ethoxycarbonylmethoxychromone (9.6 g), m.p. 127°–128° (from aqueous ethanol).

d. 2-(Tretrazol-5-yl)-7-ethoxycarbonylmethoxychromone

By the method of Example 1(c), 2-cyano-7-ethoxycarbonylmethoxychromone (5.0 g) was reacted with sodium azide (1.8 g) and ammonium chloride (1.5 g) in dimethylformamide (50 ml) to give 2-(tetrazol-5-yl)-7-ethoxycarbonylmethoxychromone (4.2 g), m.p. 237°–238° (from ethanol).

EXAMPLE 17

2-(Tetrazol-5-yl)-6-dimethylaminochromone hydrochloride

A mixture containing 2-(tetrazol-5-yl)-6-nitrochromone from Example 11 (3.1 g), 40 percent aqueous formaldehyde (5 ml), ethanol (20 ml), water (25 ml), sodium acetate (1 g), charcoal (1g) and palladium chloride (1g dissolved in 1 ml 2N hydrochloric acid) was shaken under hydrogen at room temperature for 2 hours. After filtration and extraction of the catalyst with ethanol, the combined solutions were concentrated to low bulk. On cooling 2-(tetrazol-5-yl)-6-dimethylaminochromone hydrochloride separated (1.4 g) m.p. > 340° (from ethanol).

EXAMPLE 18

2,6-Di(tetrazol-5-yl)chromone a. Chromone-2,6-dicarboxylic acid

Diethyl chromone-2,6-dicarboxylate (20.0 g) was hydrolysed by refluxing with glacial acetic acid (200 ml) and concentrated hydrochloric acid (100 ml) for 3 hours and the solid obtained on cooling was filtered off to give chromone-2,6-dicarboxylic acid (16.5 g) m.p. 312°–314° (decomp) (from ethanol).

b. Chromone-2,6-dicarboxamide

Chromone-2,6-dicarboxylic acid (23.4 g) was refluxed with thionyl chloride (22.5 ml), dimethylformamide (0.2 ml) in dichloroethane (150 ml) under nitrogen for 7 hours. Excess thionyl chloride and dichloroethane were then removed by vacuum distillation. The residual product was taken up in dichloroethane and treated with ammonia to give chromone-2,6-dicarboxamide (21.5 g) m.p. 350° (from dimethylformamide).

c. 2,6-Dicyanochromone

By the method of example 1(b), chromone-2,6-dicarboxamide (16.0 g) was dehydrated using toluene-4-sulphonyl chloride (39.3 g) and pyridine (49.6 ml) in dimethylformamide (150 ml) to give 2,6-dicyanochromone (4.2 g) m.p. 245°–246° (from ethanol).

d. 2,6Di(tetrazol-5-yl)chromone

By the method of Example 1(c), 2,6-dicyanochromone (3.0 g) was reacted with sodium azide (3.0 g) and ammonium chloride (2.4 g) in dimethylformamide (50 ml) to give 2,6-di(tetrazol-5-yl)chromone (2.4 g) m.p. 330° (from ethanol).

EXAMPLE 19

2-(Tetrazol-5-yl)-6,8, dibromochromone a. 6,8-Dibromochromone-2-carboxamide

By the method of Example 1(a), ethyl 6,8-dibromochromone-2-carboxylate (9.0 g) in anhydrous ethanol (100 ml) was treated with ammonia to give 6,8-dibromochromone-2-carboxamide (8.4 g), m.p. 318°–320° (decomp) (from ethanol dimethylformamide).

(b) 2-Cyano-6,8-dibromochromone

By the method of Example 1(b), 6,8-dibromochromone-2-carboxamide (6.0 g) was dehydrated with benzenesulphonyl chloride (4.6 g) and pyridine (4.2 ml) in dimethylformamide (50 ml) to give 2-cyano-6,8-dibromochromone (3.7 g) m.p. 160°–161° (from ethanol).

c. 2-(Tetrazol-5-yl)-6,8-dibromochromone

The the method of Example 1(c), 2-cyano-6,8-dibromochromone (3.0 g) was reacted with sodium azide (0.9 g) and ammonium chloride (0.8 g) in dimethylformamide (25 ml) to give 2-(tetrazol-5-yl)-6,8-dibromochromone (2.9 g) m.p. 269°–70° (decomp) (from ethanol).

EXAMPLE 20

2-(Tetrazol-5-yl)-3-chlorochromone a. 3-Chloro-2-cyanochromone

2-Cyanochromone (8.5 g) (prepared as in Example 1(a) ), sulphuryl chloride (34 ml) and benzoyl peroxide (1.0 g) were heated under reflux for 10 hrs. Excess sulphuryl chloride was distilled off under vacuum and the residue recrystallised twice from aqueous ethanol to give 3-Chloro-2-cyanochromone (6.5 g) m.p. 161°–162°.

b. 2-(Tetrazol-5-yl)-3-chlorochromone

By the Example of example 1(c), 3-chloro-2-cyanochromone (4.0 g) was reacted with sodium azide (1.9 g) and ammonium chloride (1.6 g) in dimethylformamide (25 ml) to give 2-(tetrazol-5-yl)-3-chlorochromone (3.7 g) m.p. 234°–236° (decomp) (from ethanol).

We claim:

1. 2-(Tetrazol-5-yl) chromone.
2. 2-(Tetrazol-5-yl) chromone-6-carboxylic acid, its pharmaceutically acceptable non-toxic salts or lower alkanol esters.
3. 2-(Tetrazol-5-yl)-5-(2-hydroxyethoxy)chromone monohydrate.
4. 2-(Tetrazol-5-yl)-3-chloro-chromone.
5. 2,6-Di(Tetrazol-5-yl) chromone.

* * * * *